(12) United States Patent
Blaszczak et al.

(10) Patent No.: US 12,116,927 B2
(45) Date of Patent: Oct. 15, 2024

(54) MID-FRAME SECTION OF A GAS TURBINE ENGINE AND CORRESPONDING METHOD OF ADJUSTING RADIAL ROTOR CLEARANCE

(71) Applicant: Siemens Energy Global GmbH & Co. KG, Munich (DE)

(72) Inventors: Grzegorz Blaszczak, Charlotte, NC (US); Amit K. Paspulati, Charlotte, NC (US); Sudeep Bosu, Charlotte, NC (US); Anil L. Salunkhe, Charlotte, NC (US); Kashinath Akki, Charlotte, NC (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 200 days.

(21) Appl. No.: 17/292,578

(22) PCT Filed: Nov. 30, 2018

(86) PCT No.: PCT/US2018/063285
§ 371 (c)(1),
(2) Date: May 10, 2021

(87) PCT Pub. No.: WO2020/112136
PCT Pub. Date: Jun. 4, 2020

(65) Prior Publication Data
US 2021/0396175 A1 Dec. 23, 2021

(51) Int. Cl.
*F02C 3/04* (2006.01)
*F04D 29/54* (2006.01)

(52) U.S. Cl.
CPC .............. *F02C 3/04* (2013.01); *F04D 29/542* (2013.01); *F05D 2220/32* (2013.01);
(Continued)

(58) Field of Classification Search
CPC ..... F05D 2230/644; F23R 2900/00017; F04D 29/542
See application file for complete search history.

(56) References Cited

U.S. PATENT DOCUMENTS

| 3,503,616 A | 3/1970 | Hickey |
| 4,112,582 A * | 9/1978 | Beckershoff ............ F01D 25/24 33/655 |

(Continued)

FOREIGN PATENT DOCUMENTS

| CN | 103261588 A | 8/2013 |
| CN | 104619956 A | 5/2015 |

(Continued)

OTHER PUBLICATIONS

PCT International Search Report and Written Opinion of International Searching Authority mailed Aug. 5, 2019 corresponding to PCT International Application No. PCT/US2018/063285 filed Nov. 30, 2018.

(Continued)

*Primary Examiner* — Gerald L Sung

(57) ABSTRACT

A mid-frame section of a gas turbine engine having a radial clearance adjustability and a method for adjusting a radial clearance to a rotor in a mid-frame section of a gas turbine engine are presented. The mid-frame section includes a radial clearance adjusting assembly arranged at a compressor exit diffuser. The radial clearance adjusting assembly is configured to adjust the radial clearance to the rotor such that the rotor is concentric with respect to components of the mid-frame section, such as the compressor exit diffuser and shaft cover. The radial clearance adjusting assembly provides radial clearance adjustability in the mid-frame section at multiple locations, such as at forward end and aft end of the compressor exit diffuser. The radial clearance adjusting (Continued)

assembly improves efficiency of the gas turbine and reduces service and operating cost of the gas turbine engine.

11 Claims, 6 Drawing Sheets

(52) U.S. Cl.
CPC .... *F05D 2230/644* (2013.01); *F05D 2230/72* (2013.01); *F05D 2240/35* (2013.01)

(56) References Cited

U.S. PATENT DOCUMENTS

| | | | |
|---|---|---|---|
| 4,320,903 A | 3/1982 | Ayache et al. | |
| 4,554,789 A | 11/1985 | Napoli et al. | |
| 4,920,741 A | 5/1990 | Liebl | |
| 5,096,375 A | 3/1992 | Ciokailo | |
| 5,513,547 A * | 5/1996 | Lovelace | B23Q 3/186 |
| | | | 81/484 |
| 5,921,749 A * | 7/1999 | McLaurin | F01D 9/042 |
| | | | 415/189 |
| 6,273,671 B1 | 8/2001 | Ress, Jr. | |
| 9,234,431 B2 | 1/2016 | Kowalski et al. | |
| 10,677,098 B2 * | 6/2020 | Shirota | F01D 25/246 |
| 2005/0169749 A1 | 8/2005 | Coulon et al. | |
| 2012/0099990 A1 * | 4/2012 | Fretwell | F01D 25/246 |
| | | | 416/131 |
| 2013/0294907 A1 | 11/2013 | Hoffacker et al. | |
| 2014/0060000 A1 | 3/2014 | Charron et al. | |
| 2014/0241876 A1 | 8/2014 | Schaefer et al. | |
| 2016/0341069 A1 * | 11/2016 | Inagaki | F01D 25/246 |
| 2017/0089209 A1 | 3/2017 | Fentem et al. | |

FOREIGN PATENT DOCUMENTS

| | | |
|---|---|---|
| CN | 106414906 A | 2/2017 |
| DE | 102017220333 A1 | 5/2019 |
| FR | 2651832 A1 | 3/1991 |
| JP | 2007046540 A | 2/2007 |
| JP | 2011089427 A | 5/2011 |
| RU | 2012119374 A | 11/2013 |
| WO | 2011045128 A1 | 4/2011 |

OTHER PUBLICATIONS

"Siemens advanced high-power gas turbine, Thermal Turbine", Zhao Jun'e, Sep. 30, 2004.

\* cited by examiner

MID-FRAME SECTION OF A GAS TURBINE ENGINE AND CORRESPONDING METHOD OF ADJUSTING RADIAL ROTOR CLEARANCE

TECHNICAL FIELD OF THE INVENTION

This invention relates generally to a mid-frame section of a gas turbine engine having a radial clearance adjustability and a method for adjusting a radial clearance to a rotor in a mid-frame section of a gas turbine engine.

DESCRIPTION OF THE RELATED ART

An industrial gas turbine engine typically includes a compressor section, a turbine section, and a mid-frame section disposed therebetween. The mid-frame section typically includes a compressor exit diffusor and a combustion assembly. The compressor exit diffusor diffuses the compressed air from the compressor section into a plenum through which the compressed air flows to a combustion assembly which mixes the compressed air with fuel and ignites the mixture and transits the ignited mixture to the turbine section for mechanical power. The gas turbine engine also includes a rotor shaft with a rotor mounted thereon that connects the compressor section, the mid-frame section and the turbine section. The mid-frame section also includes a plurality of seals arranged on the compressor exit diffusor and the shaft cover enclosing the rotor shaft. Radial clearances between the rotor to the compressor exit diffusor and the shaft cover as well as to the seals arranged thereon are very small and are critical to proper operation of the gas turbine engine.

Typically, radial clearances between the rotor to the compressor exit diffusor and the shaft cover are set for best possible level by shimming and machining the mid-frame components during assembly and service. During operation of the gas turbine engine, radial clearances of the rotor to the compressor exit diffusor and the shaft cover may shift eccentrically due to various reasons, such as centrifugal and thermal loads, which may cause premature wear of the seals arranged thereon, non-uniform air flow, and reducing efficiency of the gas turbine engine. There is a need to provide a gas turbine engine having an ability to adjust radial clearances of the rotor in the mid-frame section to maintain the rotor to be concentric to the compressor exit diffusor and the shaft cover as well as the seals arranged thereon.

SUMMARY OF THE INVENTION

Briefly described, aspects of the present invention relate to a mid-frame section of a gas turbine engine and a method for adjusting a radial clearance to a rotor in a mid-frame section of a gas turbine engine.

According to an aspect, a mid-frame section of a gas turbine engine is presented. The mid-frame section of the gas turbine engine comprises an outer casing. The mid-frame section of the gas turbine engine comprises a compressor exit diffusor enclosed by the outer casing. The compressor exit diffusor comprises a compressor exit diffusor flange interfacing with the outer casing. The mid-frame section of the gas turbine engine comprises a shaft cover enclosed by the compressor exit diffusor. The shaft cover comprises a shaft cover flange interfacing with the compressor exit diffusor. The mid-frame section of the gas turbine engine comprises a rotor enclosed by the shaft cover. The mid-frame section of the gas turbine engine comprises a radial clearance adjusting assembly arranged at the compressor exit diffusor. The radial clearance adjusting assembly is configured to adjust a radial clearance to the rotor in the mid-frame section.

According to an aspect, a method for adjusting a radial clearance to a rotor in a mid-frame section of a gas turbine engine is presented. The mid-frame section of the gas turbine engine comprises an outer casing, a compressor exit diffusor enclosed by the outer casing, a shaft cover enclosed by the compressor exit diffusor, and a rotor enclosed by the shaft cover. The compressor exit diffusor comprises a compressor exit diffusor flange interfacing with the outer casing. The shaft cover comprises a shaft cover flange interfacing with the compressor exit diffusor. The method comprises arranging a radial clearance adjusting assembly at the compressor exit diffuser. The method comprises adjusting a radial clearance to the rotor by the radial clearance adjusting assembly.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF THE INVENTION

A detailed description related to aspects of the present invention is described hereafter with respect to the accompanying figures.

Figure 1:
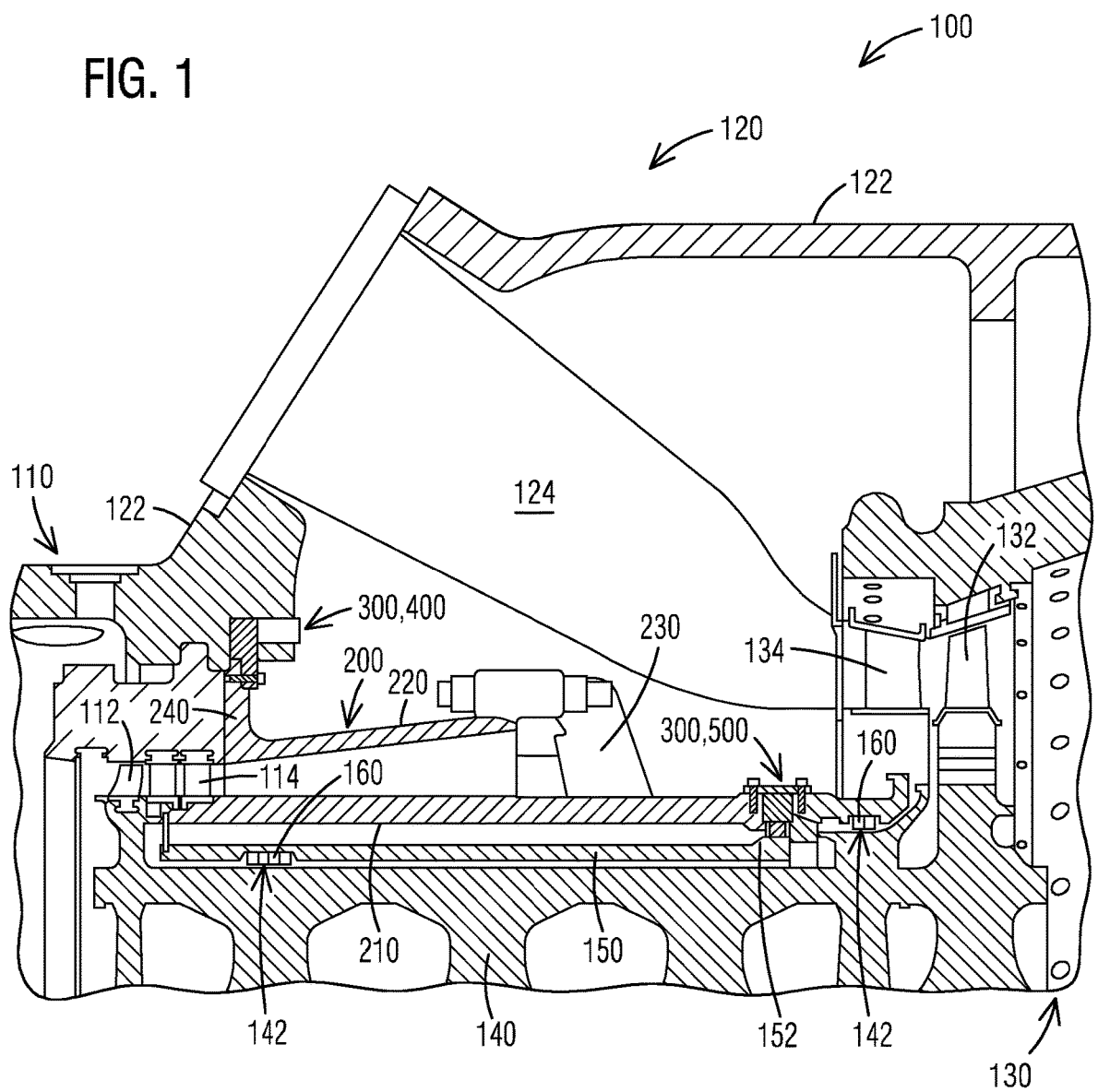
FIG. 1 is a schematic longitudinal section view of a portion of a gas turbine engine according to an embodiment of the present invention.

FIG. 1 illustrates a schematic longitudinal section view of a portion of a gas turbine engine 100 according to an embodiment of the present invention. As illustrated in FIG. 1, the gas turbine engine 100 includes a compressor section 110, a turbine section 130, and a mid-frame section 120 that is located there between. A rotor 140 longitudinally connects the compressor section 110, the mid-frame section 120 and the turbine section 130 and is circumferentially enclosed thereby. The rotor 140 may be enclosed by a shaft cover 150. The compressor section 110 includes multiple stages of compressor blades and vanes. FIG. 1 only shows the last stage compressor blade 112 and vane 114. The turbine section 130 includes multiple stages of turbine blades and vanes. FIG. 1 only shows the first stage turbine blade 132 and vane 134.

The mid-frame section 120 typically includes an outer casing 122 that encloses a combustion assembly 124 and a compressor exit diffuser 200. The compressor exit diffuser 200 is located downstream of the last stage compressor vane 114. The compressor exit diffuser 200 diffuses the compressed air from the compressor section 110 to the combustion assembly 124 in which the diffused compressed air is mixed with fuel and ignited and passes to the turbine section 130 for providing mechanical power.

The compressor exit diffusor 200 typically includes an inner compressor exit diffusor 210 and an outer compressor exit diffusor 220. The inner compressor exit diffusor 210 is connected to the outer compressor exit diffusor 220 by bolting a strut 230 to the outer compressor exit diffusor 220. Forward end of the compressor exit diffusor 200 may include a compressor exit diffusor flange 240. The compressor exit diffusor flange 240 may be arranged at the outer compressor exit diffusor 220 and interfaces with the outer casing 122. The compressor exit diffusor 200 encloses the shaft cover 150. The shaft cover 150 may include a shaft cover flange 152. The shaft cover flange 152 interfaces with the compressor exit diffusor 200 at aft end of the inner compressor exit diffusor 210.

As shown in FIG. 1, the mid-frame 120 may have at least a seal 160. The seal 160 may be arranged at components of the mid-frame section 120, such as on the compressor exit diffusor 200 or on the shaft cover 150 or on both the compressor exit diffusor 200 and the shaft cover 150. The seal 160 may be any types of seals known in the industry, such as labyrinth seal, honeycomb seal, etc. A radial clearance 142 exists between the rotor 140 to the compressor exit diffusor 200 and the shaft cover 150 as well as the seal 160 arranged thereon. The radial clearance 142 to the rotor 140 is critical for a proper operation of the gas turbine engine 100. The radial clearance 142 to the rotor 140 needs to be set concentrically for the proper operation of the gas turbine engine 100. Typically, the radial clearance 142 to the rotor 140 is very small. During operation of the gas turbine engine 100, the radial clearance 142 to the rotor 140 may be shifted and becomes eccentric. An eccentric radial clearance 142 to the rotor 140 may reduce performance of the gas turbine engine 100 and leads to premature wear of the seal 160, nonuniform air flow, increasing cooling leakage, failure of components, etc.

According to an exemplary embodiment as illustrated in FIG. 1, the mid-frame section 120 of the gas turbine engine 100 includes a radial clearance adjusting assembly 300. The radial clearance adjusting assembly 300 provides concentricity adjustability of the mid-frame section 120 to the rotor 140. The radial clearance adjusting assembly 300 may adjust the radial clearance 142 to the rotor 140 by adjusting concentricity of the compressor exit diffusor 200 to the rotor 140, or concentricity of the shaft cover 150 to the rotor 140, or concentricity of the compressor exit diffusor 200 and concentricity of the shaft cover 150 to the rotor 140. The radial clearance adjusting assembly 300 may be arranged at forward end of the compressor exit diffusor 200, or at aft end of the compressor exit diffusor 200, or at both ends of the compressor exit diffusor 200. For illustration purpose, in the exemplary embodiment of FIG. 1, the radial clearance adjusting assembly 300 includes a parallel key adjusting assembly 400 arranged at the forward end of the compressor exit diffusor 200 and a torque pin adjusting assembly 500 arranged at the aft end of the compressor exit diffusor 200. It is understood that the radial clearance adjusting assembly 300 may include any types of adjusting tools known in the industry, such as eccentric pins, wedges, shim blocks, etc.

Figure 2:
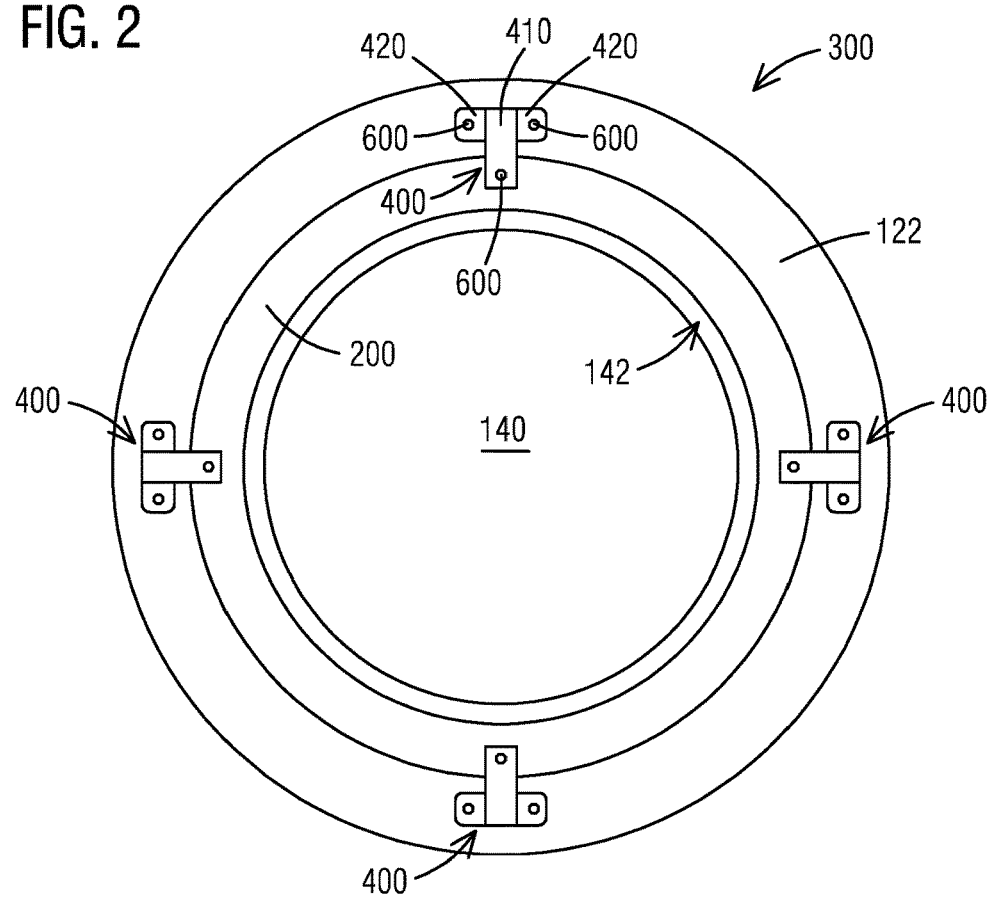
FIG. 2 is a schematic assembled diagram of a radial clearance adjusting assembly according to an embodiment of the present invention.
Figure 3:
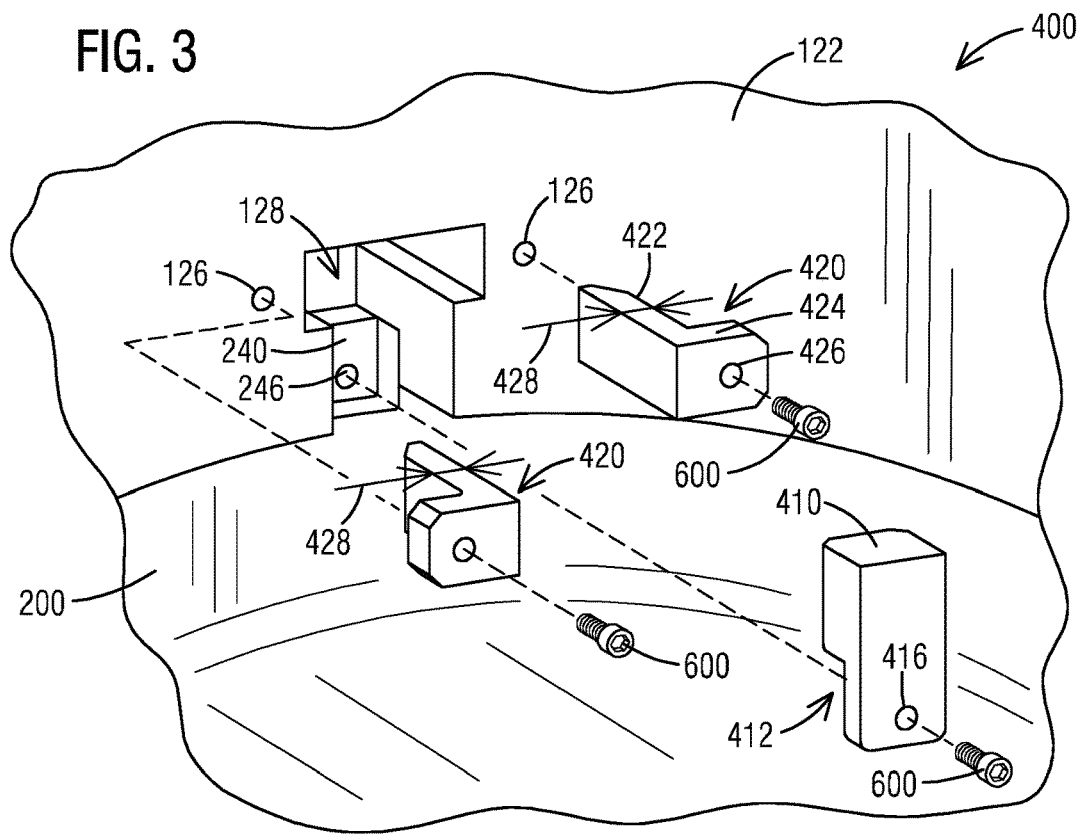
FIG. 3 is a schematic perspective enlarged exploded view of the radial clearance adjusting assembly shown in FIG. 2.

FIG. 2 is a schematic assembled diagram of a radial clearance adjusting assembly 300 according to an embodiment of the present invention. In the exemplary illustrated embodiment of FIG. 2, the radial clearance adjusting assembly 300 is a parallel key adjusting assembly 400. The parallel key adjusting assembly 400 may be arranged at the forward end of the compressor exit diffusor 200 as shown in FIG. 1. FIG. 3 is a schematic perspective enlarged exploded view of the parallel key adjusting assembly 400 shown in FIG. 2.

As shown in FIGS. 2 and 3, the rotor 140 is enclosed by the outer casing 122 and the compressor exit diffusor 200. A radial clearance 142 exists between the rotor 140 to the compressor exit diffusor 200. The outer casing 122 has a cutout 128 at an area interfacing with the compressor exit diffusor flange 240. The parallel key adjusting assembly 400 is assembled in the cutout 128. The parallel key adjusting assembly 400 includes a key 410. Forward side of the key 410 facing to the compressor exit diffusor flange 240 may have a L-shaped cutout 412. The L-shaped cutout 412 mates with the compressor exit diffusor flange 240. The key 410 is assembled in the cutout 128 by securing the L-shaped cutout 412 to the compressor exit diffusor flange 240. The key 410 may be secured to the compressor exit diffusor flange 240 via a fastener 600 passing through an aperture 416 on the L-shaped cutout 412 of the key 410 and an aperture 246 on the compressor exit diffusor flange 240. The fastener 600 may include a bolt. The parallel key adjusting assembly 400 includes a pair of shims 420. Each shim 420 may have a shim plate 422 and a shim tab 424 arranged at one end of the shim plate 422 forming a L-shaped shim 420. The shim plate 422 has a thickness 428. The L-shaped shims 420 are assembled in the cutout 128 by inserting the shim plates 422 into the cutout 128 and arranged at two circumferential sides of the key 410. The L-shaped shims 420 are secured to the outer casing 122 via fasteners 600 passing through apertures 426 on the shim tab 424 into apertures 126 on the outer casing 122. The assembled parallel key adjusting assembly 400 fits within the cutout 128 of the outer casing 122.

A plurality of the parallel key adjusting assembly 400 may be assembled to the outer casing 122 at a plurality of locations. For example, as illustrated in the exemplary illustrated embodiment of FIG. 2, the parallel key adjusting assembly 400 are assembled to the outer casing 122 at 12 o'clock location, 3 o'clock location, 6 o'clock location, and 9 o'clock location. It is understood that the parallel key adjusting assembly 400 may be assembled to the outer casing 122 at other locations.

Figure 4:
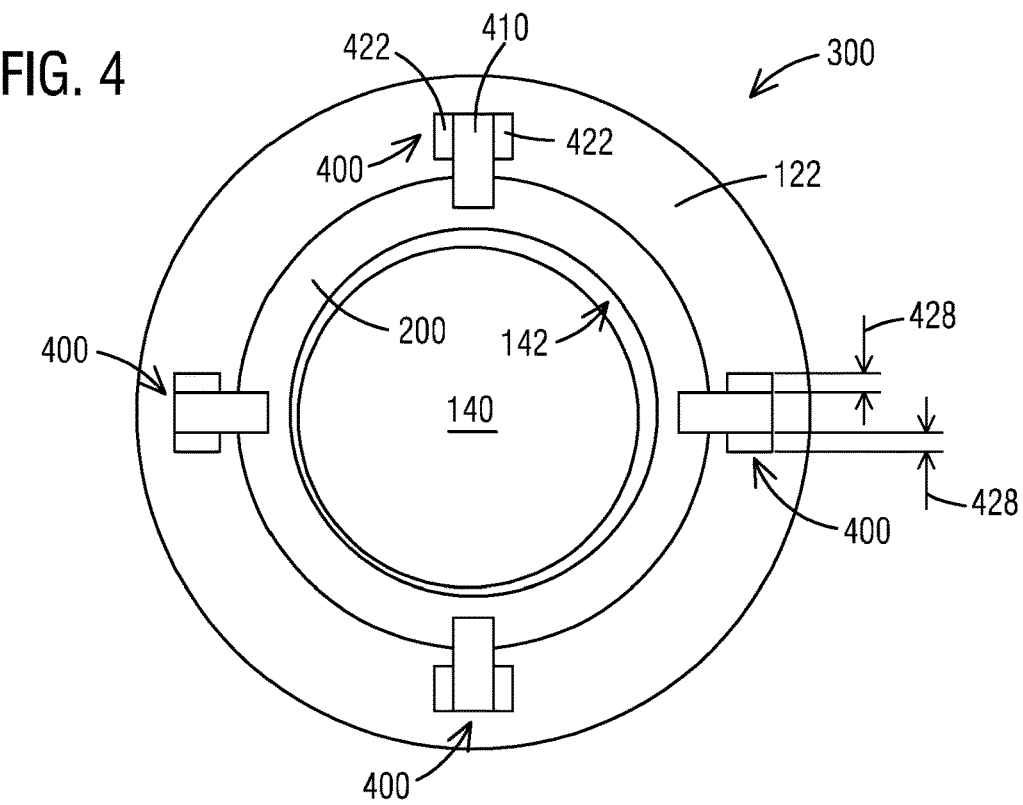
FIGS. 4 and 5 are schematic diagrams illustrating a process to adjust a radial clearance to the rotor in the mid-frame section using the radial clearance adjusting assembly shown in FIG. 2.
Figure 5:
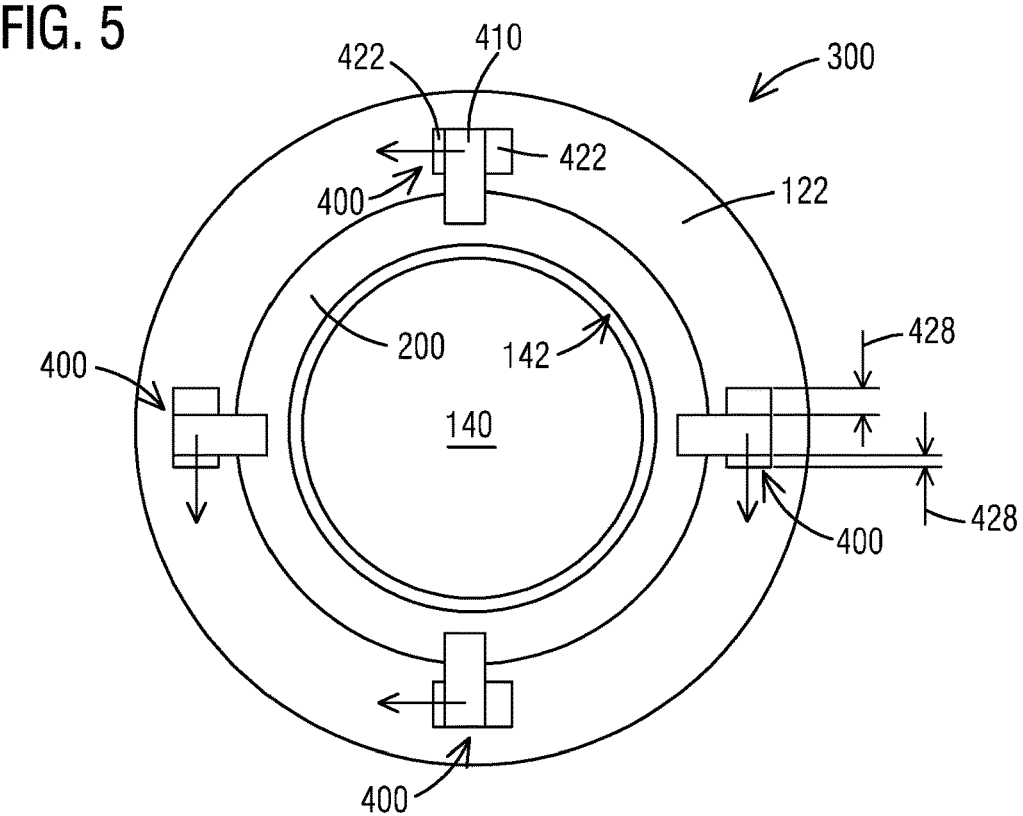

As illustrated in FIGS. 2 and 3, the radial clearance 142 to the rotor 140 is set concentrically to the compressor exit diffuser 200 during assembly. Thickness 428 of the shim plates 422 of the shims 420 of the parallel key adjusting assembly 400 may be set equally during assembly. During operation of the gas turbine engine 100, the radial clearance 142 to the rotor 140 may be shifted and becomes eccentric to the compressor exit diffuser 200, as illustrated in FIG. 4. An eccentric radial clearance 142 to the rotor 140 may reduce performance of the gas turbine engine 100, such as premature wear of seal 160 arranged at the compressor exit diffuser 200, nonuniform air flow, increasing cooling leakage, failure of components, etc. FIG. 5 is a schematic diagram illustrating a process to adjust the eccentric radial clearance 142 to the rotor 140 to be concentric with respect to the compressor exit diffuser 200 using the parallel key adjusting assembly 400 as shown in FIGS. 2 and 3.

With reference to FIGS. 4 and 5, the parallel key adjusting assembly 400 is modified. The modified parallel key adjusting assembly 400 is assembled in the cutout 128 of the outer casing 122 and the compressor exit diffuser flange 240. Thicknesses 428 of the shim plates 422 of the parallel key adjusting assembly 400 are adjusted to shift the key 410 of the parallel key adjusting assembly 400 assembled in the cutout 128 of the outer casing 122 to a direction with respect to the rotor 140. The compressor exit diffuser 200 is shifted in the same direction with respect to the rotor 140 by the key 410 which is bolted thereon. For illustration purpose, in the exemplary embodiment shown in FIGS. 4 and 5, the radial clearance 142 to the rotor 140 is shifted to the left side such that the radial clearance 142 to the rotor 140 is less in the left side than in the right side with respect to the compressor exit diffuser 200. Thicknesses 428 of the right shim plates 422 of the parallel key adjusting assemblies 400 assembled at 12 o'clock and 6 o'clock locations of the outer casing 122 are adjusted thicker than thicknesses 428 of the left shim plates 422 of the parallel key adjusting assemblies 400 assembled at the same locations so that the keys 410 assembled at the same locations are shifted horizontally to the left. Thicknesses 428 of the top shim plates 422 of the parallel key adjusting assemblies 400 assembled at 3 o'clock and 9 o'clock locations of the outer casing 122 are adjusted thicker than thicknesses 428 of the bottom shim plates 422 of the parallel key adjusting assemblies 400 assembled at the same locations so that the keys 410 of the parallel key adjusting assemblies 400 assembled at the same locations are shifted vertically to downside. An amount of the thicknesses 428 of the shim plates 422 to be adjusted corresponds to an amount of the shift of the radial clearance 142 to the rotor 140 with respect to the compressor exit diffuser 200 such that the rotor 140 is concentric to the compressor exit diffuser 200 after adjustment. It is understood that the radial clearance 142 to the rotor 140 may be shifted to other directions and a corresponding adjustment of the radial clearance 142 to the rotor 140 to be concentric with respect to the compressor exit diffuser 200 may be achieved by corresponding adjustment of the thicknesses 428 of the shim plates 422 of the parallel key adjusting assemblies 400.

Figure 6:
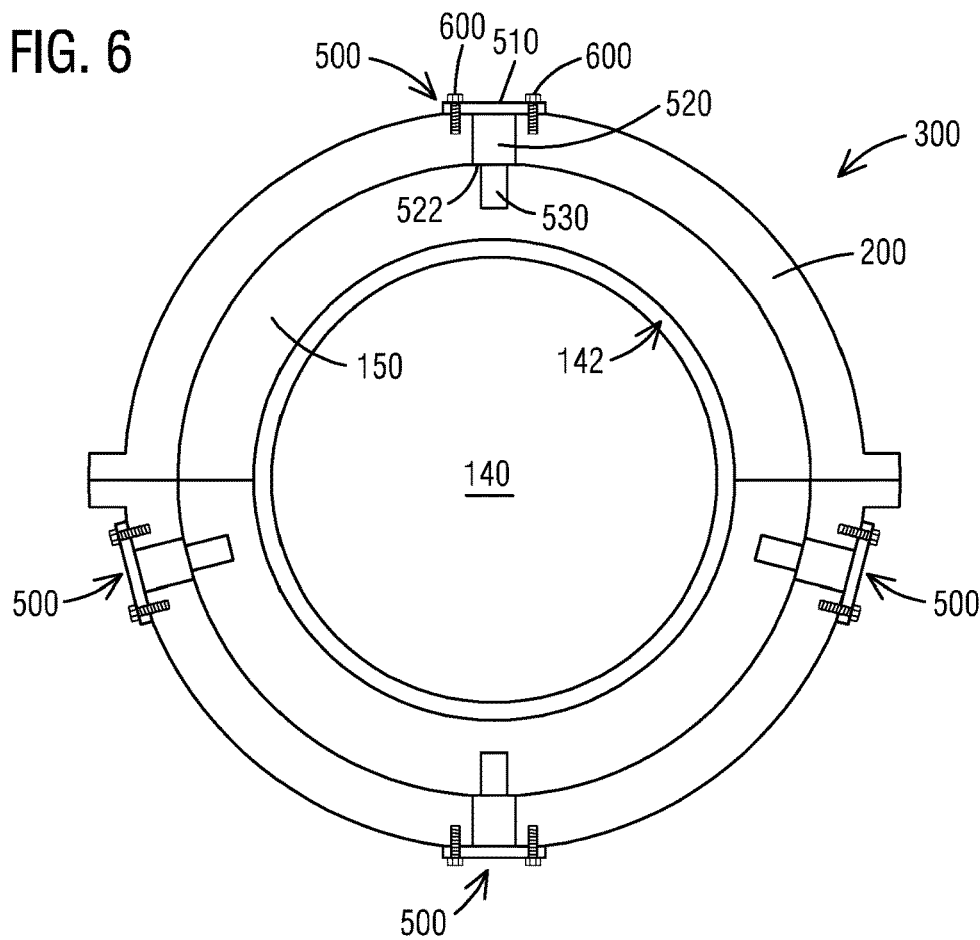
FIG. 6 is a schematic assembled diagram of a radial clearance adjusting assembly according to another embodiment of the present invention.
Figure 7:
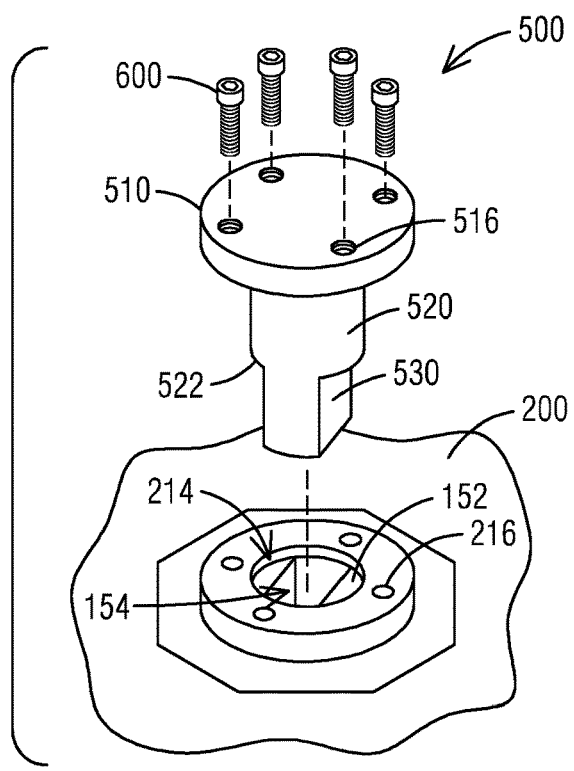
FIG. 7 is a schematic perspective enlarged exploded view of the radial clearance adjusting assembly shown in FIG. 6.

FIG. 6 is a schematic assembled diagram of a radial clearance adjusting assembly 300 according to another embodiment of the present invention. In the exemplary illustrated embodiment of FIG. 6, the radial clearance adjusting assembly 300 is a torque pin adjusting assembly 500. The torque pin adjusting assembly 500 may be arranged at the aft end of the compressor exit diffuser 200 as shown in FIG. 1. For illustration purpose, the torque pin adjusting assembly 500 is arranged at the inner compressor exit diffusor 210 at an area interfacing with the shaft cover flange 152. FIG. 7 is a schematic perspective enlarged exploded view of the torque pin adjusting assembly 500 shown in FIG. 6.

As shown in FIGS. 6 and 7, the rotor 140 is enclosed by the shaft cover 150 and the compressor exit diffusor 200 and has a radial clearance 142 to the shaft cover 150. The compressor exit diffusor 200 includes a cutout 214 at an area interfacing with the shaft cover flange 152. The torque pin adjusting assembly 500 includes a pin cap 510, a pin body 520 attached to the pin cap 510 and a pin block 530 arranged at an end surface 522 of the pin body 520. The torque pin adjusting assembly 500 is assembled in the cutout 214 by inserting the pin body 520 into the cutout 214. The pin body 520 may be cylindrical shape. The cutout 214 may be a hole. The torque pin adjusting assembly 500 is secured to the compressor exit diffusor 200. For illustration purpose, in the exemplary embodiment of FIGS. 6 and 7, the torque pin adjusting assembly 500 is secured to the compressor exit diffusor 200 via fasteners 600 passing through apertures 516 on the pin cap 510 and apertures 216 on the compressor exit diffusor 200. It is understood that the torque pin adjusting assembly 500 may be secured to the compressor exit diffusor 200 via other ways known in the industry, such as via torque pin retainer, etc. The shaft cover flange 152 has a groove 154. The groove 154 is notched to fit the pin block 530. The pin block 530 may be square shape.

A plurality of torque pin adjusting assemblies 500 may be assembled to the compressor exit diffusor 200 at a plurality of locations. For example, as illustrated in the exemplary embodiment of FIG. 6, the torque pin adjusting assemblies 500 are assembled to the compressor exit diffusor 200 at 12 o'clock location and 6 o'clock location in the vertical direction, and a small amount degree below 3 o'clock location and 9 o'clock location in the horizontal direction. It is understood that the torque pin adjusting assemblies 500 may be assembled to the compressor exit diffusor 200 at other locations.

Figure 8:
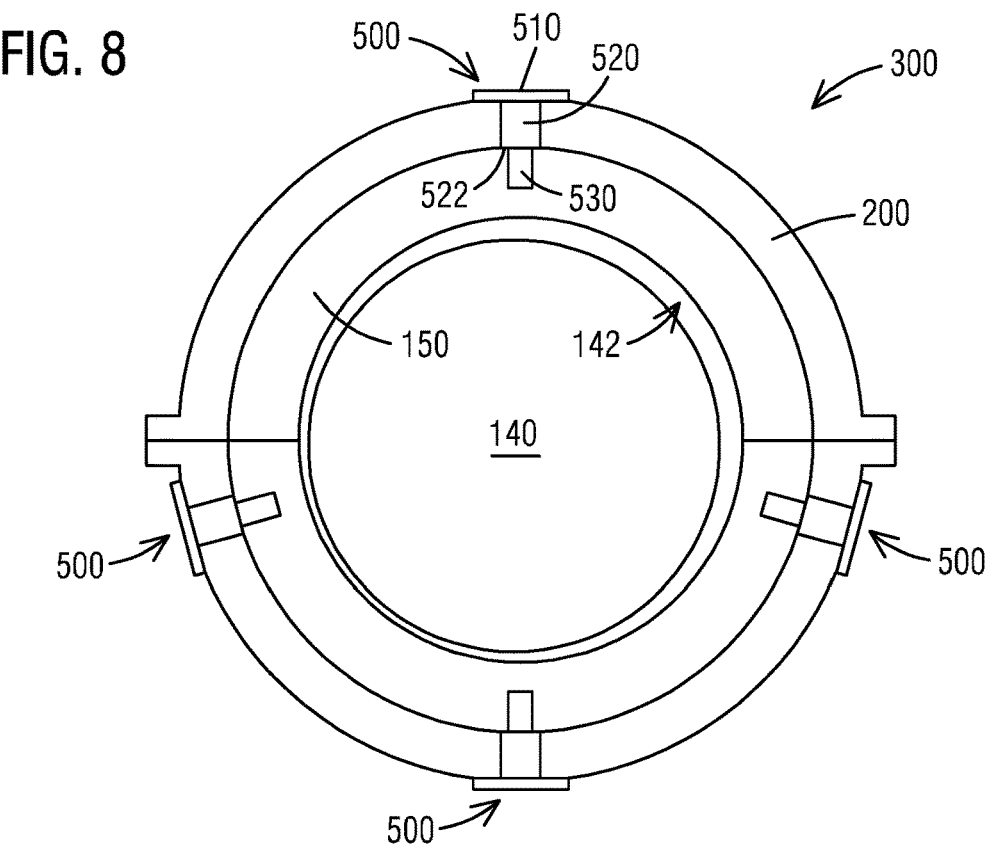
FIGS. 8 and 9 are schematic diagrams illustrating a process to adjust a radial clearance to the rotor in the mid-frame section using the radial clearance adjusting assembly shown in FIG. 6.
Figure 9:
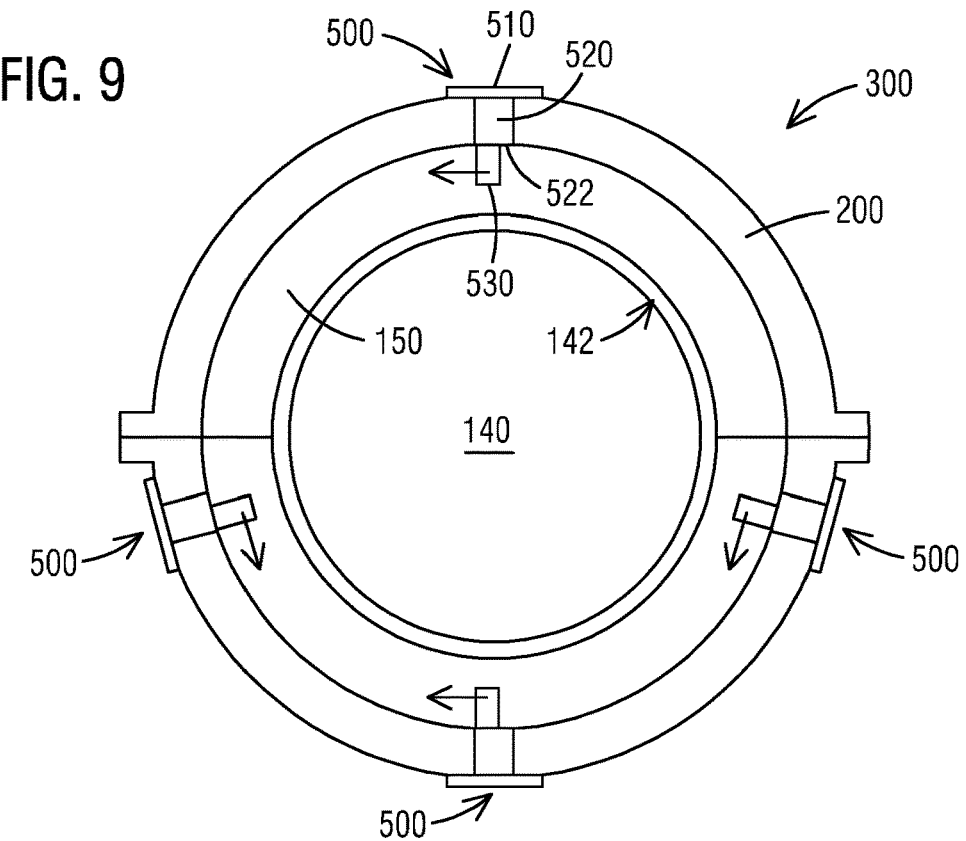

With reference to FIGS. 6 and 7, the radial clearance 142 to the rotor 140 is set concentrically to the shaft cover 150 during assembly. The pin block 530 may be set at a center location of the end surface 522 of the pin body 520. During operation of the gas turbine engine 100, the radial clearance 142 to the rotor 140 may be shifted and becomes eccentric to the shaft cover 150 as illustrated in FIG. 8. An eccentric radial clearance 142 to the rotor 140 may reduce performance of the gas turbine engine 100, such as premature wear of seal 160, nonuniform air flow, increasing cooling leakage, failure of components, etc. FIG. 9 is a schematic diagram illustrating a process to adjust the eccentric radial clearance 142 to the rotor 140 to be concentric with respect to the shaft cover 150 using the torque pin adjusting assembly 500 as shown in FIG. 6.

With reference to FIGS. 8 and 9, the torque pin adjusting assemblies 500 is modified. The modified torque pin adjusting assembly 500 is assembled in the cutout 214 of the compressor exit diffusor 200 and the groove 154 on the shaft cover flange 152. Location of the pin block 530 at the end surface 522 of the pin body 520 is adjusted to a direction with respect to the rotor 140. The shaft cover 150 is shifted in the same direction with respect to the rotor 140 by the pin block 530 fitted in the groove 154 on the shaft cover flange 152. For illustration purpose, in the exemplary embodiment of FIGS. 8 and 9, the radial clearance 142 to the rotor 140 is shifted to the left side such that the radial clearance 142 to the rotor 140 is less in the left side than in the right side with respect to the shaft cover 150. Locations of the pin blocks 530 at the end surfaces 522 of the pin bodies 520 assembled at 12 o'clock and 6 o'clock locations of the compressor exit diffusor 200 are adjusted to the left side so that the shaft cover 150 is shifted horizontally to the left.

Locations of the pin blocks 530 at the end surfaces 522 of the pin bodies 520 assembled below the 3 o'clock and 9 o'clock locations of the compressor exit diffusor 200 are adjusted to downside so that the shaft cover 150 is shifted to downside. An amount of the adjustment of the locations of the pin blocks 530 at the end surfaces 522 of the pin body 520 corresponds to an amount of the shift of the radial clearance 142 to the rotor 140 such that the rotor 140 is concentric to the shaft cover 150 and the compressor exit diffusor 200 after adjustment. It is understood that the radial clearance 142 to the rotor 140 may be shifted to other directions and a corresponding adjustment of the radial clearance 142 to the rotor 140 to be concentric to the shaft cover 150 and the compressor exit diffuser 200 may be achieved by corresponding adjustment of the locations of the pin blocks 530 at the end surfaces 522 of the pin body 520 of the torque pin adjusting assemblies 500.

Figure 10:
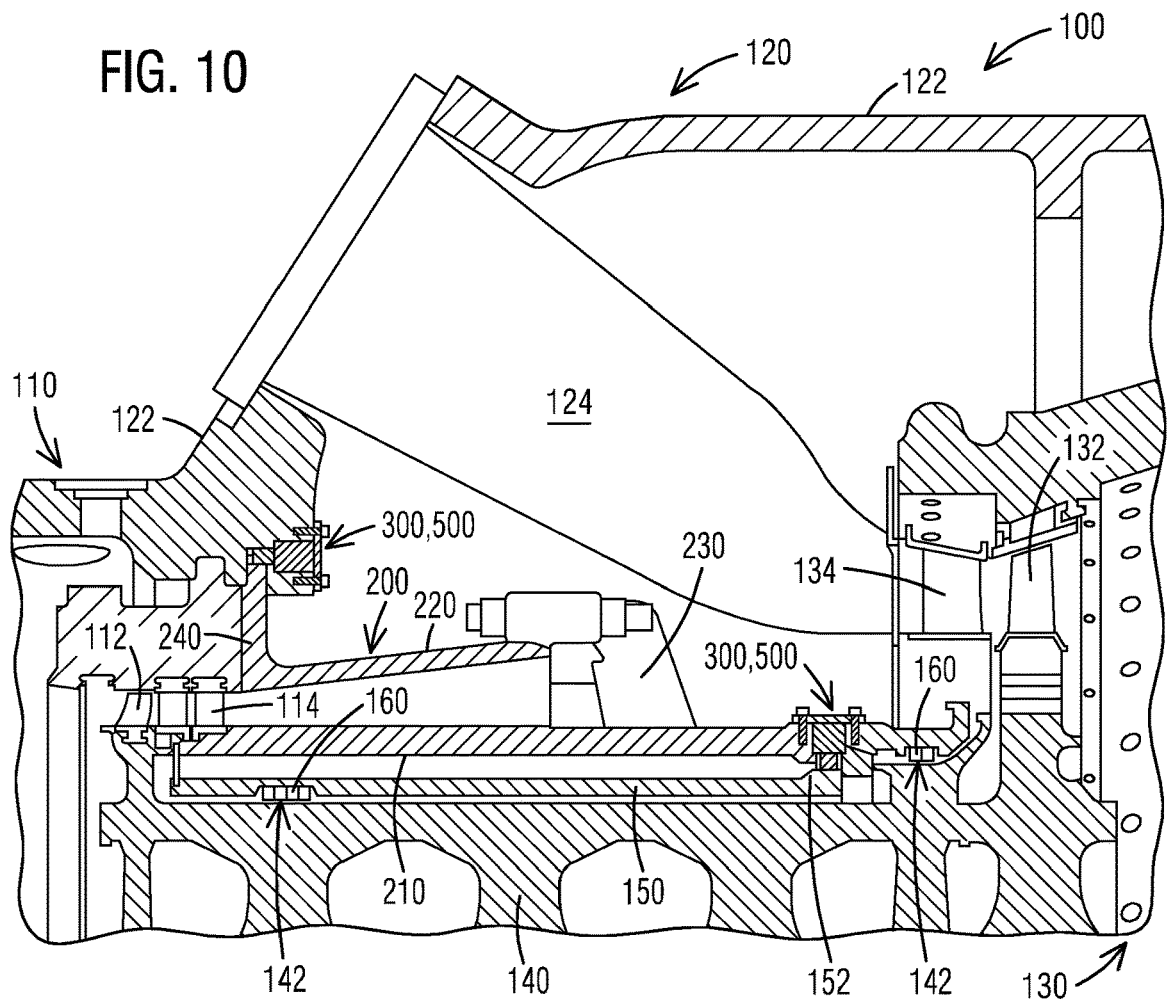
FIG. 10 is a schematic longitudinal section view of a portion of a gas turbine engine according to a further embodiment of the present invention.
Figure 11:
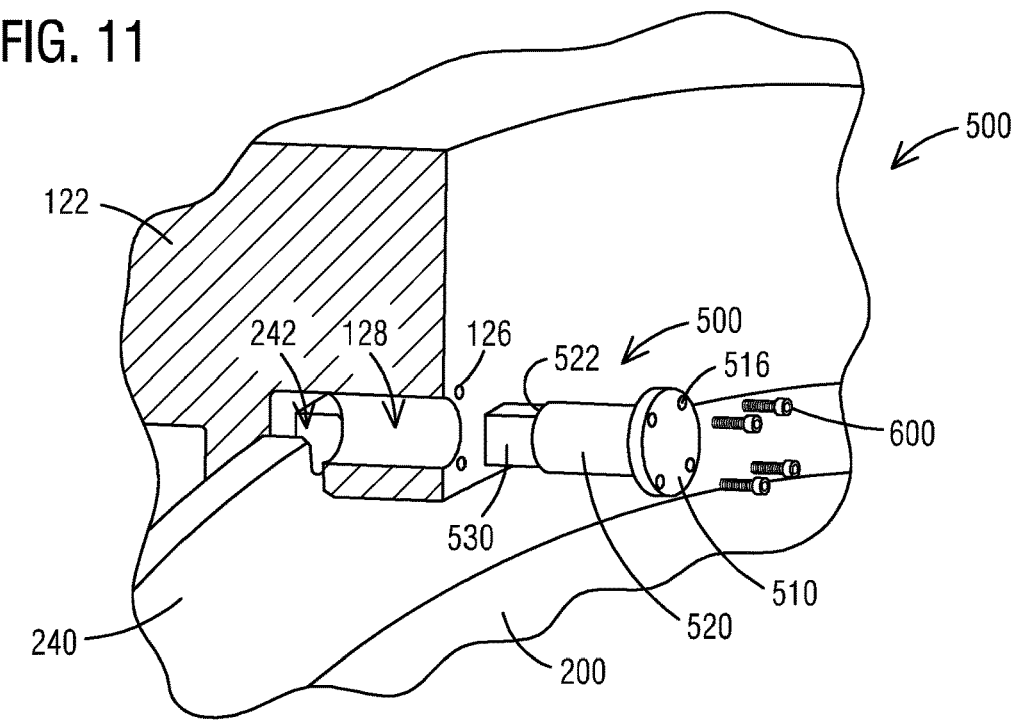
FIG. 11 is a schematic perspective enlarged exploded view of a radial clearance adjusting assembly shown in FIG. 10.

FIG. 10 is a schematic longitudinal section view of a portion of a gas turbine engine 100 according to a further embodiment of the present invention. As illustrated in FIG. 10, the mid-frame 120 of the gas turbine engine 100 includes a radial clearance adjusting assembly 300. The radial clearance adjusting assembly 300 includes a torque pin adjusting assembly 500 arranged at the forward end of the compressor exit diffusor 200. The torque pin adjusting assembly 500 is arranged at the forward end of the compressor exit diffusor 200 in an axial direction. FIG. 11 is a schematic perspective enlarged exploded view of the torque pin adjusting assembly 500 arranged at the forward end of the compressor exit diffusor 200 as shown in FIG. 10. The embodiment of FIG. 10 otherwise corresponds to the embodiment of FIG. 1. Corresponding parts of FIG. 10 are correspondingly numbered, which are not described again with reference to FIG. 10.

As shown in FIGS. 10 and 11, the outer casing 122 has a cutout 128 at an area interfacing with the compressor exit diffusor flange 240. The torque pin adjusting assembly 500 includes a pin cap 510, a pin body 520 attached to the pin cap 510 and a pin block 530 arranged at an end surface 522 of the pin body 520. The torque pin adjusting assembly 500 is assembled in the cutout 128 by inserting the pin body 520 into the cutout 128. The torque pin adjusting assembly 500 is secured to the outer casing 122 via fasteners 600 passing through apertures 516 on the pin cap 510 and apertures 126 on the outer casing 122. The compressor exit diffusor flange 240 has a groove 242. The groove 242 is notched to fit the pin block 530 of the torque pin adjusting assembly 500. The process of the torque pin adjusting assembly 500 to adjust the radial clearance 142 to the rotor 140 with respect to the compressor exit diffusor 200 is similar to the process as illustrated in FIGS. 8 and 9, which is not described in detail herein.

According to an aspect, the proposed radial clearance adjusting assembly 300 provides a radial clearance adjustability to a mid-frame section 120 of a gas turbine engine 100. The proposed radial clearance adjusting assembly 300 may provide a concentric radial clearance 142 to a rotor 140 with respect to components in the mid-frame section 120 of the gas turbine engine 100, such as a concentric radial clearance 142 to the rotor 140 with respect to a compressor exit diffusor 200 and a shaft cover 150. The concentric radial clearance 142 to the rotor 140 with respect to the components in the mid-frame section 120 prevents premature wear of seals 160 arranged at the components and thus prevents premature failure of the components and reduces service and operating cost of the gas turbine engine 100. The proposed radial clearance adjusting assembly 300 reduces cooling leakage and increases efficiency of the gas turbine engine 100.

According to an aspect, the proposed radial clearance adjusting assembly 300 provides a radial clearance adjustability to the mid-frame section 120 of the gas turbine engine 100 at multiple locations, such as at forward end of the compressor exit diffusor 200, at aft end of the compressor exit diffusor 200, or at both the forward end and the aft end of the compressor exit diffusor 200. The proposed radial clearance adjusting assembly 300 may provide an easy assembly to set a desired radial clearance 142 to the rotor 140 in the mid frame section 120 of the gas turbine engine 100 without shimming or machining.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Gas Turbine Engine
110: Compressor Section
112: Last Stage Compressor Blade
114: Last Stage Compressor Vane
120: Mid-Frame Section
122: Outer Casing
124: Combustion Assembly
126: Aperture on Outer Casing
128: Cutout of Outer Casing
130: Turbine Section
132: First Stage Turbine Blade
134: First Stage Turbine Vane
140: Rotor
142: Radial Clearance to Rotor
150: Shaft Cover
152: Shaft Cover Flange
154: Groove on Shaft Cover Flange
160: Seal
200: Compressor Exit Diffusor
210: Inner Compressor Exit Diffusor
214: Cutout on Compressor Exit Diffusor
216: Aperture on Compressor Exit Diffusor
220: Outer Compressor Exit Diffusor
230: Strut
240: Compressor Exit Diffusor Flange
242: Groove on Compressor Exit Diffusor Flange
300: Radial Clearance Adjusting Assembly
400: Parallel Key Adjusting Assembly
410: Key 412: L-shaped Cutout on Key
416: Aperture on L-shaped Cutout of Key
420: Shim
422: Shim Plate
424: Shim Tab
426: Aperture on Shim Tab
428: Thickness of Shim Plate
500: Torque Pin Adjusting Assembly
510: Pin Cap
516: Aperture on Pin Cap
520: Pin Body
522: End Surface of Pin Body
530: Pin Block
600: Fastener

What is claimed is:

1. A mid-frame section of a gas turbine engine comprising:
an outer casing;
a compressor exit diffusor enclosed by the outer casing, wherein the compressor exit diffusor comprises a compressor exit diffusor flange interfacing with the outer casing;
a shaft cover enclosed by the compressor exit diffusor, wherein the shaft cover comprises a shaft cover flange interfacing with the compressor exit diffusor;
a rotor enclosed by the shaft cover; and
a radial clearance adjusting assembly arranged at the compressor exit diffusor,
wherein the radial clearance adjusting assembly is configured to adjust a radial clearance to the rotor in the mid-frame section,
wherein the radial clearance adjusting assembly comprises a parallel key adjusting assembly comprising a key and a pair of shims, and
wherein each shim comprises a shim plate and a shim tab arranged at one end of the shim plate forming a L-shape.

2. The mid-frame section of the gas turbine engine as claimed in claim 1, wherein the parallel key adjusting assembly is arranged at the compressor exit diffusor flange.

3. The mid-frame section of the gas turbine engine as claimed in claim 2, wherein the outer casing comprises a cutout at an area interfacing with the compressor exit diffusor flange, and wherein the parallel key adjusting assembly is assembled in the cutout and the key is secured to the compressor exit diffusor flange.

4. The mid-frame section of the gas turbine engine as claimed in claim 3, wherein the shim plates are assembled on two circumferential sides of the key in the cutout and the shim tabs are secured to the outer casing.

5. The mid-frame section of the gas turbine engine as claimed in claim 4, wherein thicknesses of the shim plates are configured to be adjusted to shift the compressor exit diffusor to a direction with respect to the rotor for adjusting the radial clearance to the rotor.

6. A mid-frame section of a gas turbine engine comprising:
an outer casing;
a compressor exit diffusor enclosed by the outer casing, wherein the compressor exit diffusor comprises a compressor exit diffusor flange interfacing with the outer casing;
a shaft cover enclosed by the compressor exit diffusor, wherein the shaft cover comprises a shaft cover flange interfacing with the compressor exit diffusor;
a rotor enclosed by the shaft cover; and
a radial clearance adjusting assembly arranged at the compressor exit diffusor,
wherein the radial clearance adjusting assembly is configured to adjust a radial clearance to the rotor in the mid-frame section,
wherein the radial clearance adjusting assembly comprises a torque pin adjusting assembly comprising a pin body and a pin block directly and radially extending from an end surface of the pin body wherein the pin body comprises a longitudinal axis, the pin body is arranged such that the longitudinal axis is perpendicular to an engine longitudinal axis, the pin block defining a planar surface, the pin block and the planar surface formed as a single inseparable component,
wherein the torque pin adjusting assembly is arranged at the compressor exit diffusor at an area interfacing with the shaft cover flange,
wherein the compressor exit diffusor comprises a cutout at the area interfacing with the shaft cover flange, wherein the shaft cover flange comprises a groove, wherein the pin body is inserted in the cutout, and wherein the pin block fits in the groove,
wherein the planar surface of the pin block is in direct contact with the groove, and
wherein a position of the planar surface of the pin block at the end surface of the pin body is moveable from a first position to a second position to adjust the radial clearance to the rotor.

7. The mid-frame section of the gas turbine engine as claimed in claim 6, wherein the position of the pin block at the end surface of the pin body is moveable to shift the shaft cover to a direction with respect to the rotor for adjusting the radial clearance to the rotor.

8. The mid-frame section of the gas turbine engine as claimed in claim 6, wherein the position of the planar surface of the pin block is set at an off-center location of the end surface of the pin body.

9. A method for adjusting a radial clearance to a rotor in a mid-frame section of a gas turbine engine, wherein the mid-frame section of the gas turbine engine comprises an outer casing, a compressor exit diffusor enclosed by the outer casing, a shaft cover enclosed by the compressor exit diffusor, and a rotor enclosed by the shaft cover, wherein the compressor exit diffusor comprises a compressor exit diffusor flange interfacing with the outer casing, wherein the shaft cover comprises a shaft cover flange interfacing with the compressor exit diffusor, the method comprising:
arranging a radial clearance adjusting assembly at the compressor exit diffuser; and
adjusting a radial clearance to the rotor by the radial clearance adjusting assembly, wherein the radial clearance adjusting assembly is configured to adjust the radial clearance to the rotor in the mid-frame section,
wherein the radial clearance adjusting assembly comprises a parallel key adjusting assembly comprising a key and a pair of shims, and
wherein each shim comprises a shim plate and a shim tab arranged at one end of the shim plate forming a L-shape.

10. The method as claimed in claim 9, wherein the parallel key adjusting assembly is arranged at the compressor exit diffusor flange.

11. The method as claimed in claim 10, wherein the key is assembled in a cutout of the outer casing at an area interfacing with the compressor exit diffusor flange and secured to the compressor exit diffusor flange, wherein the shim plates are assembled on two circumferential sides of the key in the cutout and the shim tabs are secured to the outer casing, and wherein the radial clearance to the rotor is adjusted by adjusting thicknesses of the shim plates to shift the compressor exit diffusor to a direction with respect to the rotor.

\* \* \* \* \*